(12) United States Patent
Luneau

(10) Patent No.: US 7,203,488 B2
(45) Date of Patent: Apr. 10, 2007

(54) FLEXIBLE SOFTWARE RADIO TRANSCEIVER

(76) Inventor: Louis Luneau, 692 Filiatrault Street, Ville St-Laurent, Québec (CA)

( * ) Notice: Subject to any disclaimer, the term of this patent is extended or adjusted under 35 U.S.C. 154(b) by 198 days.

(21) Appl. No.: 10/290,488

(22) Filed: Nov. 8, 2002

(65) Prior Publication Data

US 2004/0203709 A1    Oct. 14, 2004

(51) Int. Cl.
H04Q 7/20 (2006.01)
H04B 3/36 (2006.01)
H03D 3/24 (2006.01)

(52) U.S. Cl. .............. 455/422.1; 455/432.1; 455/7; 375/316; 375/200

(58) Field of Classification Search ........... 455/422.1, 455/552.1, 272, 432.1, 452.2, 127.4, 188.1, 455/200.1, 553.1, 76, 561, 108, 422, 7; 375/316, 375/260, 347, 130, 200; 370/227, 395.1, 370/466, 347, 352
See application file for complete search history.

(56) References Cited

U.S. PATENT DOCUMENTS

| | | | | |
|---|---|---|---|---|
| 5,396,653 A * | 3/1995 | Kivari et al. ............... 455/88 |
| 5,436,890 A * | 7/1995 | Read et al. ................ 370/352 |
| 5,668,837 A * | 9/1997 | Dent ........................ 375/316 |
| 5,796,772 A * | 8/1998 | Smith et al. ............... 375/130 |
| 5,832,389 A * | 11/1998 | Dent ........................ 455/562.1 |
| 6,014,571 A * | 1/2000 | Enoki ....................... 455/552.1 |
| 6,091,715 A * | 7/2000 | Vucetic et al. ............. 370/277 |
| 6,091,963 A * | 7/2000 | Mannerstr.ang.le et al. ..................... 455/552.1 |
| 6,252,909 B1 * | 6/2001 | Tzannes et al. ............ 375/260 |
| 6,262,981 B1 * | 7/2001 | Schmutz ................... 370/347 |
| 6,308,048 B1 * | 10/2001 | Gore et al. ................... 455/76 |
| 6,334,051 B1 * | 12/2001 | Tsurumi et al. ............ 455/324 |
| 6,363,262 B1 * | 3/2002 | McNicol .................... 455/561 |
| 6,404,775 B1 | 6/2002 | Leslie et al. |
| 6,496,546 B1 * | 12/2002 | Allpress et al. ............ 375/316 |
| 6,574,459 B1 * | 6/2003 | Kaminski et al. .......... 455/272 |
| 6,654,428 B1 * | 11/2003 | Bose et al. ................. 375/316 |
| 6,674,997 B2 * | 1/2004 | Hoctor ....................... 455/108 |
| 6,694,373 B1 * | 2/2004 | Sastry et al. ............... 709/238 |
| 6,707,963 B2 * | 3/2004 | Kawarai ...................... 385/24 |
| 6,796,555 B1 * | 9/2004 | Blahut ...................... 370/395.1 |
| 6,816,715 B1 * | 11/2004 | Mano ....................... 455/161.3 |
| 6,914,950 B1 * | 7/2005 | Luneau ...................... 375/347 |
| 2002/0015442 A1 | 2/2002 | Masaaki et al. |
| 2002/0090915 A1 * | 7/2002 | Komara et al. ............... 455/69 |
| 2002/0131377 A1 * | 9/2002 | DeJaco et al. ............. 370/329 |
| 2003/0012221 A1 * | 1/2003 | El-Maleh et al. .......... 370/466 |
| 2003/0054777 A1 * | 3/2003 | Hoctor ....................... 455/108 |

* cited by examiner

*Primary Examiner*—Joseph Feild
*Assistant Examiner*—Kiet Doan
(74) *Attorney, Agent, or Firm*—Holme Roberts & Owen LLP; Thomas J. Rossa; Ronald Gorsche

(57) ABSTRACT

A method and apparatus is disclosed for receiving a wireless wideband signal and transmitting a converted signal to a transmitting unit. The transmitting unit may or not be wireless. The apparatus comprises a plurality of wireless wideband receiving units, a plurality of narrowband converters, a plurality of wireless wideband transmitting units, a plurality of wideband signal converters, a protocol converter and a switching unit.

24 Claims, 12 Drawing Sheets

FLEXIBLE SOFTWARE RADIO TRANSCEIVER

TECHNICAL FIELD

This invention pertains to the field of radio telecommunications. More precisely, this invention relates to the field of digital wireless transceivers.

BACKGROUND OF THE INVENTION

Radio transceivers are used in various types of applications ranging from personal communications to monitoring applications.

There is usually a trade off in communication systems.

Simple hardware and software enable transceiving information using a lot of spectrum, which de facto limits a number of users being able to communicate simultaneously.

On the other hand, more complex systems enable transceiving the information using a shorter bandwidth.

Transition to more and more bandwidth efficient communication therefore requires more and more complicated hardware and software.

Gordon E Moore stated in 1965 that the number of transistors per square inch on integrated circuit had doubled every year since the integrated circuit was invented. This then enables to design more complex systems, capable of transceiving information using a smaller bandwidth.

As a result, new protocols are introduced for guiding the transceiving of information. Unfortunately, implementation of new protocols in telecommunication systems quickly creates obsolete transceiving devices.

Moreover, it may be difficult to communicate with more than one communication protocols and a combination of protocols may change according to regulation for instance.

The present invention provides a method and apparatus that will overcome the above-mentioned drawbacks.

SUMMARY OF THE INVENTION

It is an object of the invention to provide an apparatus for providing a data signal to a remote communication apparatus operating using a communication protocol different from the apparatus.

It is another object of the invention to provide a method for receiving a data signal originating from a first communication apparatus and transmitting at least one part of the data signal to a second communication apparatus.

Yet another object of the invention is to provide a method for receiving a data signal originating from a first type of communication apparatus and transmitting at least one part of the data signal to a second type of communication apparatus.

According to an aspect of the invention, there is provided a method for receiving a wireless signal and transmitting at least one part of the wireless signal using a plurality of wireless transmitting units, the method comprising the steps of receiving a narrowband signal from a narrowband signal source unit, selecting a suitable wideband signal converter from a plurality of wideband signal converters, each adapted to receive and convert a narrowband signal into a wideband signal, providing the received narrowband signal to the selected suitable wideband signal converter, receiving a wideband converted signal from the selected suitable wideband signal converter, selecting a suitable wireless wideband transmitting unit from a plurality of wireless wideband transmitting units, and transmitting the wideband converted signal using the selected wireless wideband transmitting unit.

According to another aspect of the invention, there is provided a method for forwarding a received signal to a transmitting unit operating under a second communication protocol, the method comprising the steps of receiving a narrowband signal of a first protocol from a narrowband signal source unit, selecting a second protocol from a plurality of protocols, converting the narrowband signal into said second protocol, selecting a transmitting unit from a plurality of transmitting units, each transmitting unit of the plurality of transmitting units adapted to receive and transmit a narrowband signal, and transmitting the converted narrowband signal to the selected transmitting unit of the plurality of transmitting units.

According to another aspect of the invention, there is provided an apparatus for receiving a wireless signal and transmitting at least one part of the wireless signal using a plurality of wireless transmitting units, the apparatus comprising a narrowband signal providing unit, a plurality of wideband signal converters, each adapted to receive a narrowband signal and provide a wideband signal, a plurality of wireless wideband transmitting units receiving a wideband signal and transmitting a wireless wideband signal, and a switching unit for connecting the narrowband signal providing unit to a selected wideband signal converter of the plurality of wideband signal converters in accordance with a wideband signal converter selection signal and to a selected wireless wideband transmitting unit from the plurality of wireless wideband transmitting units in accordance with a wireless transmitting unit selection signal.

According to another aspect of the invention, there is provided an apparatus. An apparatus for forwarding a received signal to a transmitting unit operating under a second communication protocol, the apparatus comprising a narrowband signal providing unit, a protocol converter receiving the narrowband signal and providing a protocol converted narrowband signal according to a protocol selection signal, a plurality of transmitting units, each of the plurality of transmitting units adapted to receive a narrowband signal and to transmit the narrowband signal; and a switching unit for connecting the narrowband signal providing unit to the protocol converter and further to a selected transmitting unit of the plurality of transmitting units in accordance with a transmitting unit selection signal and to the protocol selection signal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

A communication apparatus intended to forward a communication to another communication apparatus usually comprises a receiving unit which receives a radio signal from a first communication apparatus, processes it and transmits it using a transmitting unit to another communication apparatus.

Figure 1:
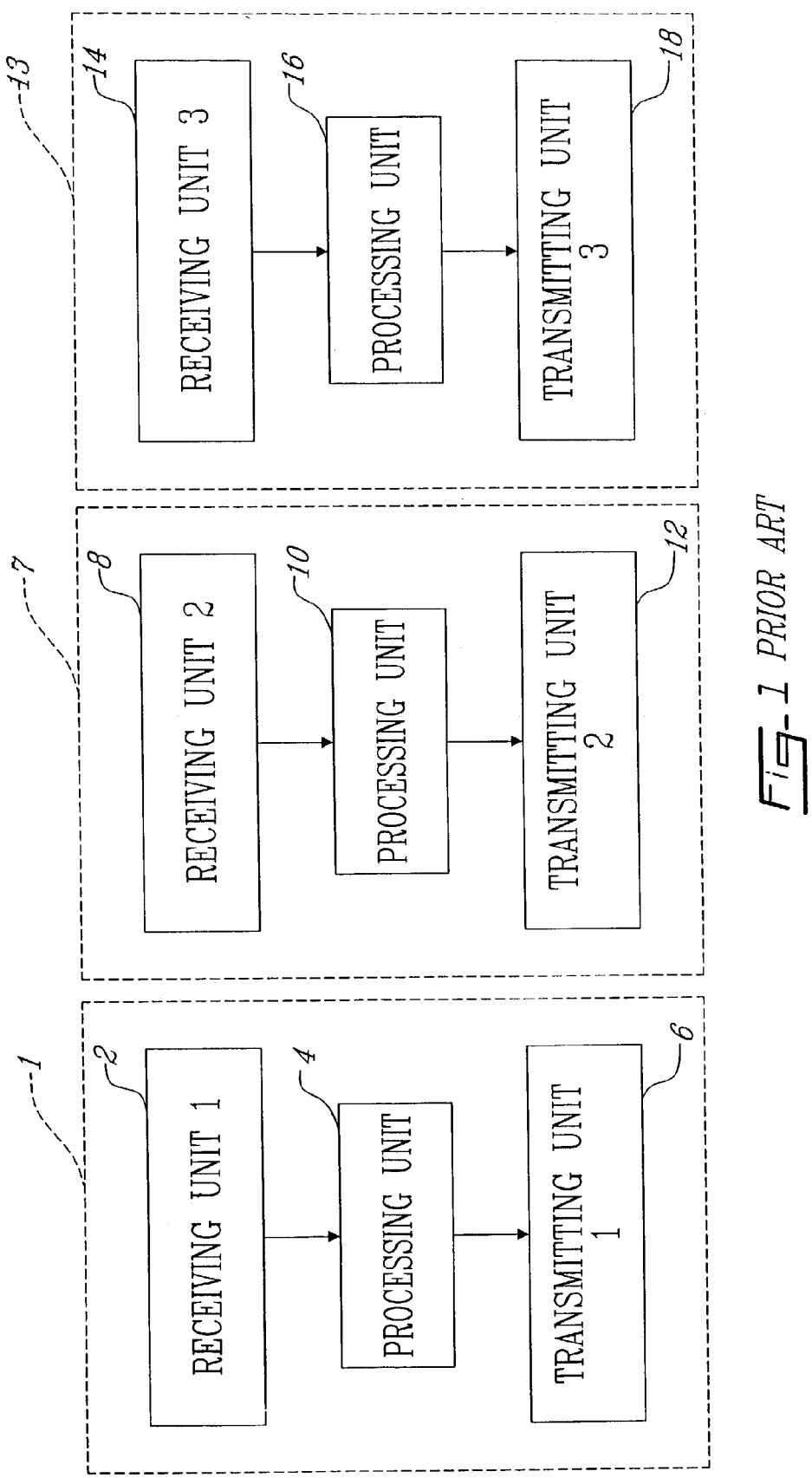
FIG. 1 is block diagram of prior art.

FIG. 1 shows an embodiment of prior art of such a communication apparatus.

If it is desirable to receive a radio signal from three different types of communication apparatus and to transmit at least one part of the radio signal to three other types of communication apparatus, three different communication apparatus are needed.

A first communication apparatus 1 comprises a receiving unit 2, a processing unit 4 and a transmitting unit 6. The first communication apparatus receives a radio signal from a first type of communication apparatus and transmits it using the transmitting unit 6 to a first type of receiving apparatus.

A second communication apparatus 7 comprises a receiving unit 8, a processing unit 10 and a transmitting unit 12. The second communication apparatus receives a radio signal from a second type of communication apparatus and transmits it using the transmitting unit 12 to a second type of receiving apparatus.

A third communication apparatus 13 comprises a receiving unit 14, a processing unit 16 and a transmitting unit 18. The third communication apparatus receives a radio signal from a third type of communication apparatus and transmits it using the transmitting unit 18 to a third type of receiving apparatus.

As communication standards evolve, such schemes, the first communication apparatus 1, the second communication apparatus 7 and the third communication apparatus 13 may quickly become obsolete and therefore costly.

Figure 2:
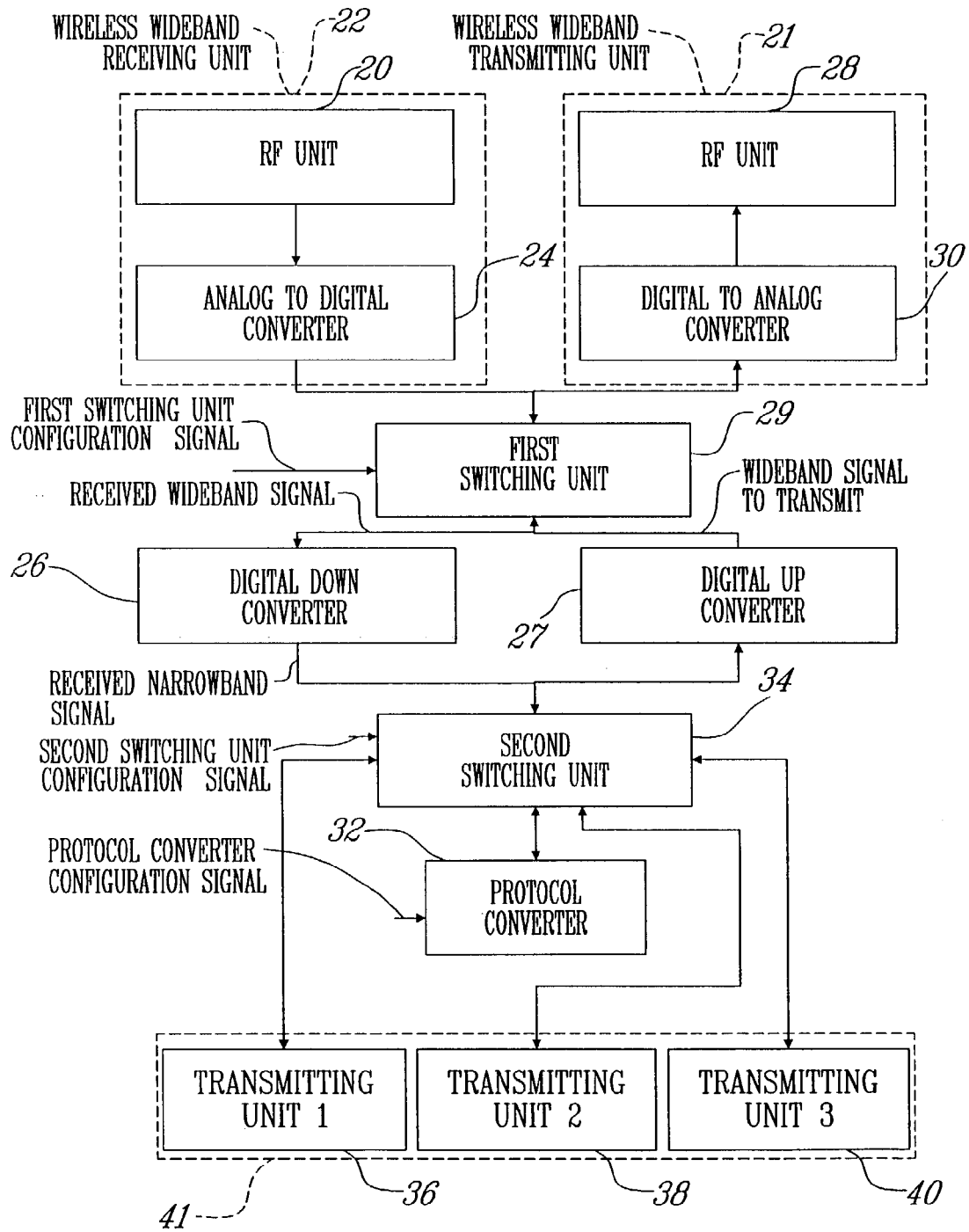
FIG. 2 is a block diagram of one embodiment of the invention; the apparatus comprises a plurality of reception units, a protocol converter, a first switching unit, a second switching unit, a plurality of wireless transmitting units and a plurality of non-wireless transmitting units.

Now referring to FIG. 2, there is shown the preferred embodiment of the invention.

The apparatus comprises a plurality of wireless wideband receiving units 22, a plurality of wireless wideband transmitting units 21, a first switching unit 29, a plurality of narrowband signal converters 26, a plurality of wideband signal converters 27, a second switching unit 34, a protocol converter 32, a first transmitting unit 36, a second transmitting unit 38 and a third transmitting unit 40.

In the preferred embodiment of the invention, the narrowband signal converters 26 are implemented using digital up converters, which are shown in FIG. 2

Still in the preferred embodiment of the invention, the wideband signal converters 27 are implemented using digital down converters, which are shown in FIG. 2.

Each of the plurality of wireless wideband receiving units 22 comprises a RF unit 20 and an analog to digital converter 24.

Each of the plurality of wireless wideband transmitting units 21 comprises a RF transmitting unit 28 and a digital to analog converter 30.

The first switching unit 29 is controlled by a first switching unit configuration signal.

Each of the plurality of wireless wideband receiving units 22 may be connected to a narrowband signal converter of the plurality of narrowband signal converters 26 using the first switching unit 29 and according to the first switching unit configuration signal.

Each of the wideband signal converter of the plurality of the wideband signal converters 27 may be connected to a wireless wideband transmitting unit of the plurality of wireless wideband transmitting units 21 using the first switching unit 29 and according to the first switching unit configuration signal.

The RF unit 20 receives a wideband RF signal and provides a RF signal to the analog to digital converter 24. Now referring to FIG. 8, there is shown the RF unit 20 in the preferred embodiment of the invention.

The analog to digital converter 24 receives the RF signal and provides a digital signal to the first switching unit 29. In the preferred embodiment of the invention, the analog to digital converter 24 is an Analog Device AD6645ASQ. Still in the preferred embodiment of the invention, the analog to digital converter 24 operates at 78.125 Mega Samples per second (Ms/s).

In the preferred embodiment of the invention, the digital to analog converter 30 receives a digital signal and provides an analog signal at 156.25 MS/s to the RF transmitting unit 28. The digital to analog converter 30 is, in the preferred embodiment of the invention an Analog Device DA9755AST.

The analog signal generated by the digital to analog converter 30 is provided to the RF transmitting unit 28.

The RF transmitting unit 28 provides a wideband RF signal. Now referring to FIG. 8, there is shown the RF transmitting unit 28 in the preferred embodiment of the invention.

In the preferred embodiment of the invention, each digital down converter of the plurality of narrowband signal converters 26 is an Intersil ISL5416.

Still in the preferred embodiment of the invention, each digital up converter of the plurality of wideband signal converters 27 is an Intersil ISL5217.

The second switching unit 34 is controlled by a second switching unit configuration signal. Each of the plurality of wideband signal converters 27, each of the plurality of narrowband signal converters 26, the protocol converter 32, the transmitting unit 1 36, the transmitting unit 2 38 and the transmitting unit 3 40 may be connected together through using the second switching unit 34 according to the second switching unit configuration signal. It will be further appreciated that the second switching unit 34 may also receive data from the transmitting unit 1 36, the transmitting unit 2 38 and the transmitting unit 3 40.

It will be appreciated by someone skilled in the art that this embodiment is merely explanatory. More than one protocol converter 32 may be connected to the second switching unit 34. Furthermore, more or less than three transmitting units may be connected to the second switching unit 34.

A received narrowband signal provided by one of the plurality of narrowband signal converters 26 may be provided therefore either to a wideband signal converter of the plurality of wideband signal converters 27, or to the protocol converter 32 or to a transmitting unit of the plurality of transmitting units according to the second switching unit configuration signal by the second switching unit 34.

As explained below, the protocol converter 32 receives a signal originating from the a narrowband signal converter of the plurality of narrowband signal converters 26 and operates a protocol conversion according to a protocol selection signal as explained below. The protocol selection signal may be provided by a user or a processing unit as explained below.

The protocol converted signal is then provided back to the second switching unit 34.

Figure 3:
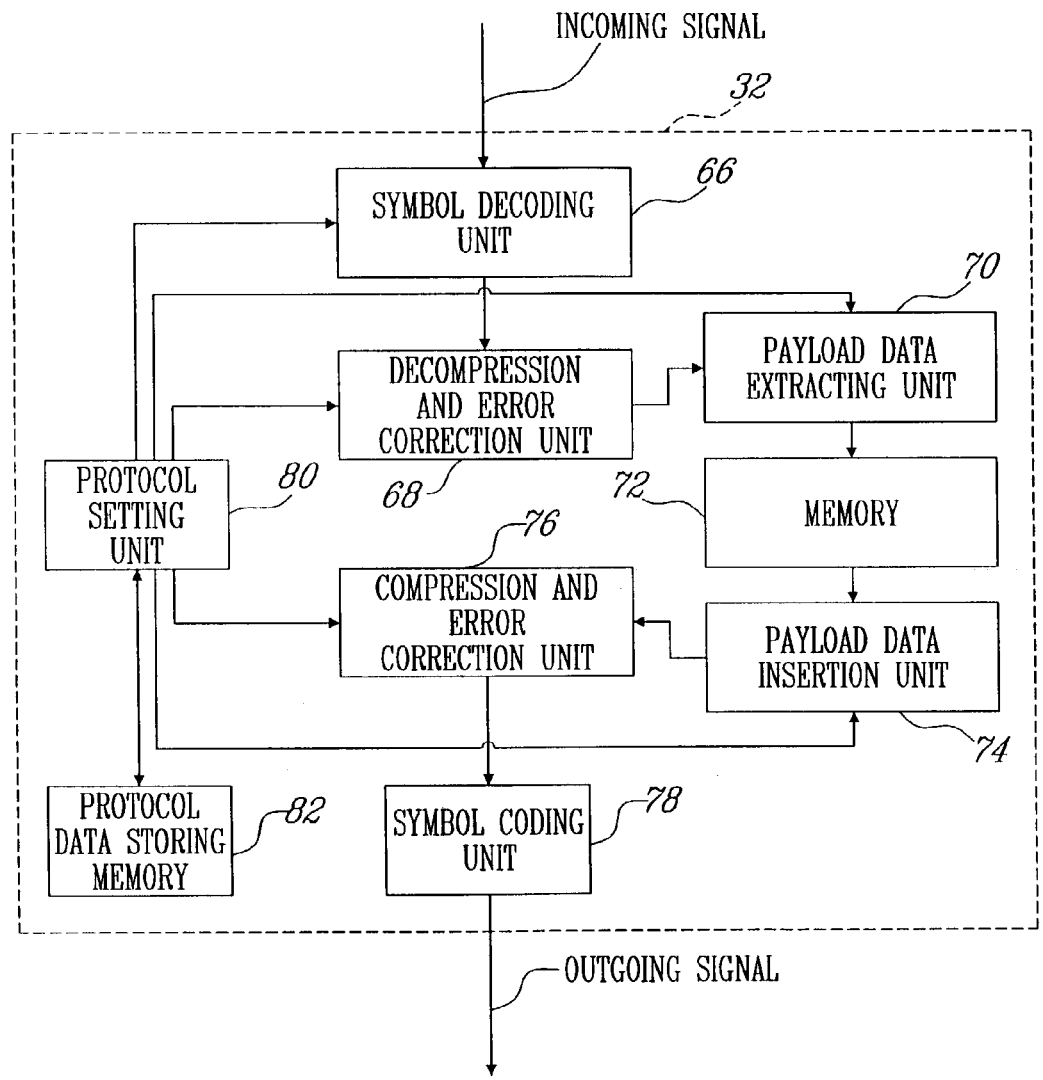
FIG. 3 is a block diagram which shows the protocol converter in the preferred embodiment of the invention.

Now referring to FIG. 3, there is shown a block diagram of the protocol converter 32.

The protocol converter 32 comprises a symbol decoding unit 66, a decompression and error correction unit 68, a payload data extracting unit 70, a memory 72, a payload data inserting unit 74, a compression and error correction unit 76, a symbol coding unit 78, a protocol setting unit 80 and a protocol data storing memory 82.

The symbol decoding unit 66 receives an incoming signal of a first protocol and provides a symbol decoded signal to the decompression and error correction unit 68 according to a symbol decoding configuration signal provided by the protocol setting unit 80. The symbol decoding unit 66 may be implemented differently according to various schemes depending on the first protocol as will note someone skilled in the art.

The decompression and error correction unit 68 receives the symbol decoded signal and provides a decoded and error corrected signal to the payload data extracting unit 70 in accordance with a decompression and an error correction configuration signal provided by the protocol setting unit 80. The symbol decoding unit 66 may be implemented differently according to various schemes depending on the first protocol as will note someone skilled in the art.

The payload data extracting unit 70 extracts data of the decoded and error corrected signal in accordance with a payload extraction scheme signal provided by the protocol setting unit. The payload data extracting unit 70 may be implemented differently according to various schemes depending on the first protocol as will note someone skilled in the art.

The data extracted by the payload data extracting unit 70 are then temporary stored in the memory 72. In the preferred embodiment of the invention, the memory 72 is implemented in an FPGA.

The payload data inserting unit 74 selects at least one part of the stored payload data in the memory 72 and creates data in accordance with a data creation scheme signal provided by the protocol setting unit. The payload data inserting unit 74 selects the at least one part of the stored payload data in the memory 72 and creates data in accordance with a data creation scheme signal representative of a second protocol. Someone skilled in the art will appreciate that the payload data inserting unit 74 may be implemented in various ways.

The compression and error correction unit 76 receives the data created by the payload data inserting unit 74 and creates compressed and error corrected data in accordance with the compression and error correction signal provided by the protocol setting unit 80. In the preferred embodiment of the invention, the compression and error correction unit 76 is implemented in the FPGA. Someone skilled in the art will appreciate that the compression and error correction unit 76 may be implemented in various ways.

The symbol coding unit 78 receives the compression and error corrected signal and provides a symbol encoded signal in accordance with a symbol coding scheme signal provided by the protocol setting unit 80.

The protocol data storing memory 82 stores data for a plurality of data protocols. More precisely, and for each of the plurality of data protocols, the protocol data storing memory 82 stores a related symbol encoding scheme and a symbol decoding scheme, a compression/error correction coding scheme, a decompression/error correction decoding scheme, a payload data inserting scheme and a payload data extracting scheme.

The protocol setting unit 80 receives the input data protocol selected and the output data protocol selected. The protocol setting unit 80 retrieves from the protocol data storing memory 82 the related symbol encoding scheme, the symbol decoding scheme, the compression/error correction coding scheme, the decompression/error correction decoding scheme, the payload data inserting scheme and the payload data extracting scheme and provides them respectively to the symbol coding unit 78, the symbol encoding unit 66, the compression and error correction unit 76, the decompression and error correction unit 68, the payload data inserting unit 74 and the payload data extracting unit 70.

It will be appreciated by someone skilled in the art that the protocol converter may be implemented in various ways. A software implementation of the protocol converter will be performed in the preferred embodiment of the invention.

Figure 4:
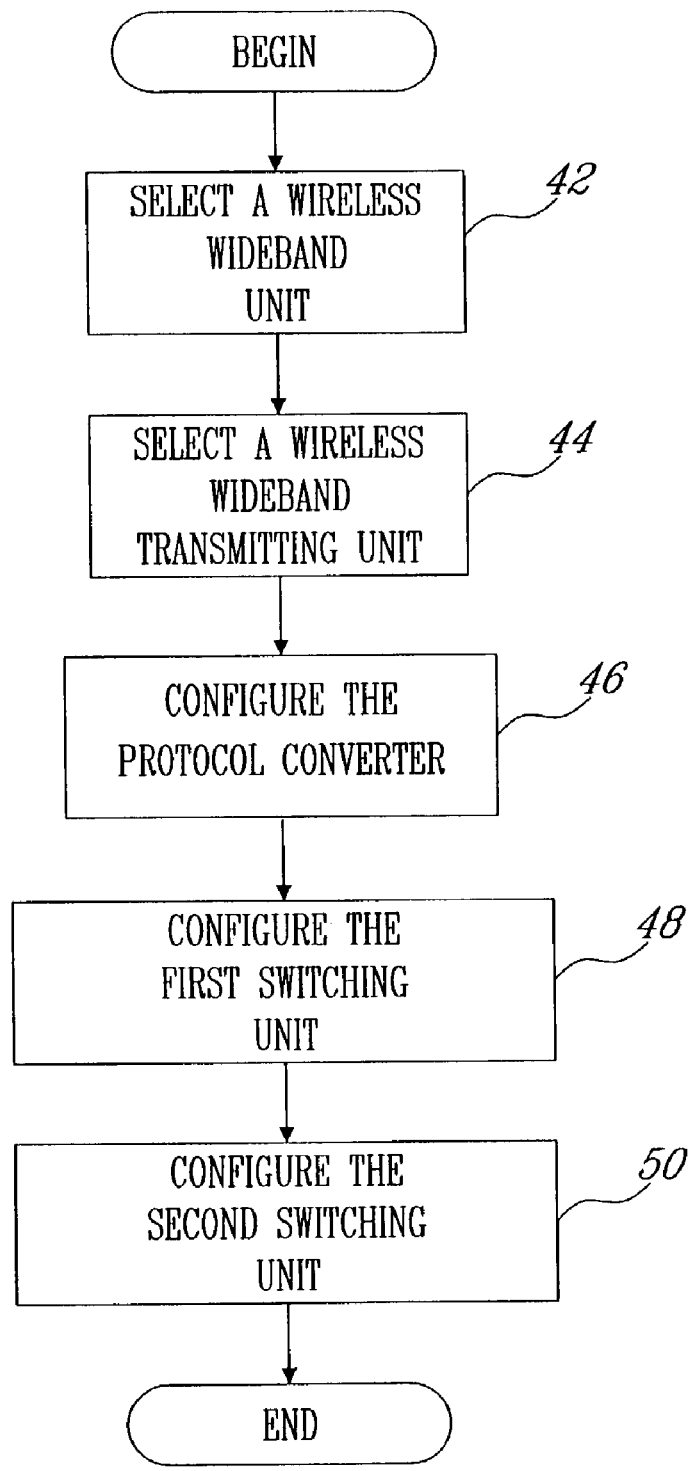
FIG. 4 is a flow chart which shows how the apparatus operates in the preferred embodiment of the invention.

Now referring to FIG. 4, there is shown how the apparatus operates.

According to step 42, a wireless wideband receiving unit of the plurality of wireless wideband receiving units 22 is selected.

According to step 44, a transmitting unit is selected. The transmitting unit is either selected from the plurality of wireless wideband transmitting units 21 or from the plurality of transmitting units 41.

According to step 46, the protocol converter 32 is configured. The configuration of the protocol converter 32 is explained below. The protocol converter 32 is configured using a protocol converter configuration signal.

According to step 48, the first switching unit 29 is configured according to the selected receiving unit and the selected transmitting unit selected respectively in steps 42 and 44. The first switching unit 29 is configured using a first switching unit configuration signal.

According to step 50, the second switching unit 32 is configured according to the selected transmitting unit and to the selected receiving unit. The second switching unit 32 is configured using a second switching unit configuration signal. It will be appreciated that using the protocol converter 32 is not mandatory.

The apparatus has therefore an architecture that offers flexibility. The transmitting unit selected may therefore be of the wireless type, if the transmitting unit selected is a wireless wideband transmitting unit, or not if the transmitting unit selected is either the transmitting unit 1 36, or the transmitting unit 2 38 or the transmitting unit 3 40.

In fact, and in the preferred embodiment of the invention, the transmitting unit 1, the transmitting unit 2 and the transmitting unit 3 are wire connected to a network. The network may be a LAN or a WAN. In the case of a LAN, various protocols may be implemented in the protocol converter 32 in order to forward data. The various protocols comprise Internet Protocol (IP), Frame Relay, Novel Netware Protocol, X.400, etc.

It will be further appreciated that this architecture enables scalability, as a transmitting unit may be easily added or subtracted from the apparatus via the second switching unit 34.

Furthermore, a wireless wideband transmitting unit may also be added or subtracted easily from the apparatus via the first switching unit 29.

Figure 5:
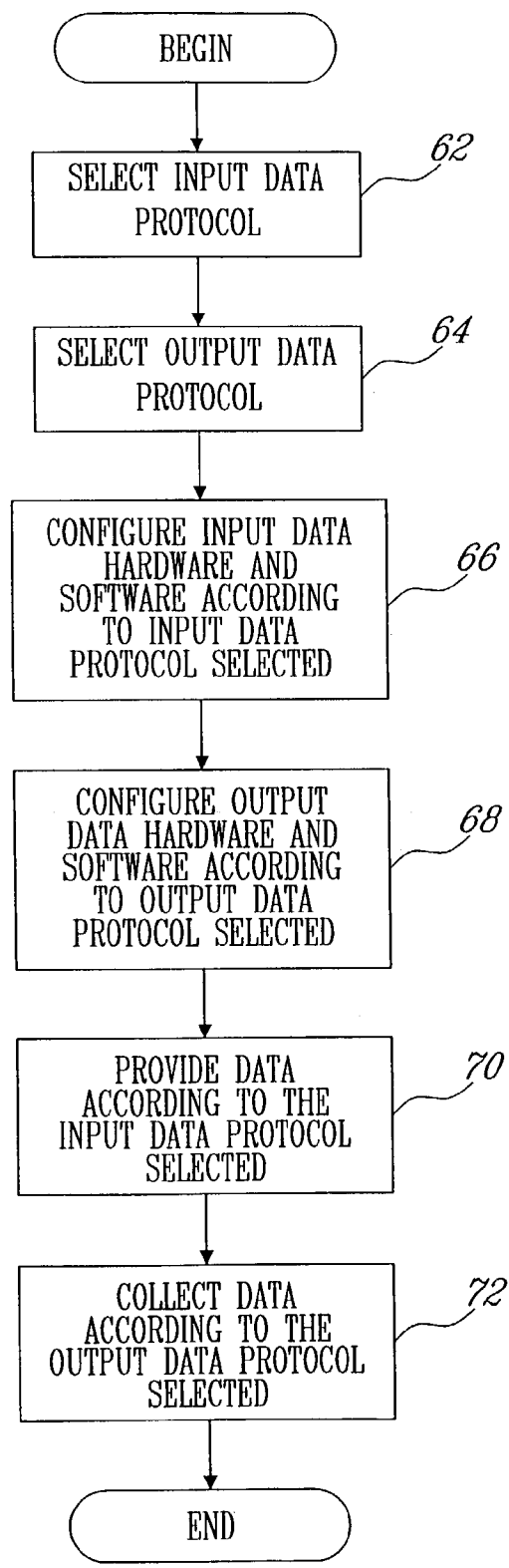
FIG. 5 is a flow chart which shows how the protocol converter operates in the preferred embodiment of the invention.

Now referring to FIG. 5, there is shown how the protocol converter 32 operates.

According to step 62, an input data protocol is selected. The input data protocol is selected among a plurality of protocols using an input selection signal. For instance, the plurality of protocols comprise AMPS and IS136 for wireless communications. Many ocher protocols may be added.

According to step 64, an output data protocol is selected. The output data protocol is selected among a plurality of protocols using an output selection signal. For instance, the plurality of protocols comprises AMPS and IS136 for wireless communications.

According to step 66, input data related software and hardware are configured according to the input data protocol selected according to step 42.

According to step 68, output data related software and hardware are configured according to the output data protocol selected according to step 44.

According to step 70, data is provided to the protocol converter 32 according to the input data protocol selected in step 42.

According to step 72, the protocol converted signal is outputted from the protocol converter 32 in accordance with the output data protocol selected according to step 44.

Reception of an AMPS Signal

Figure 6:
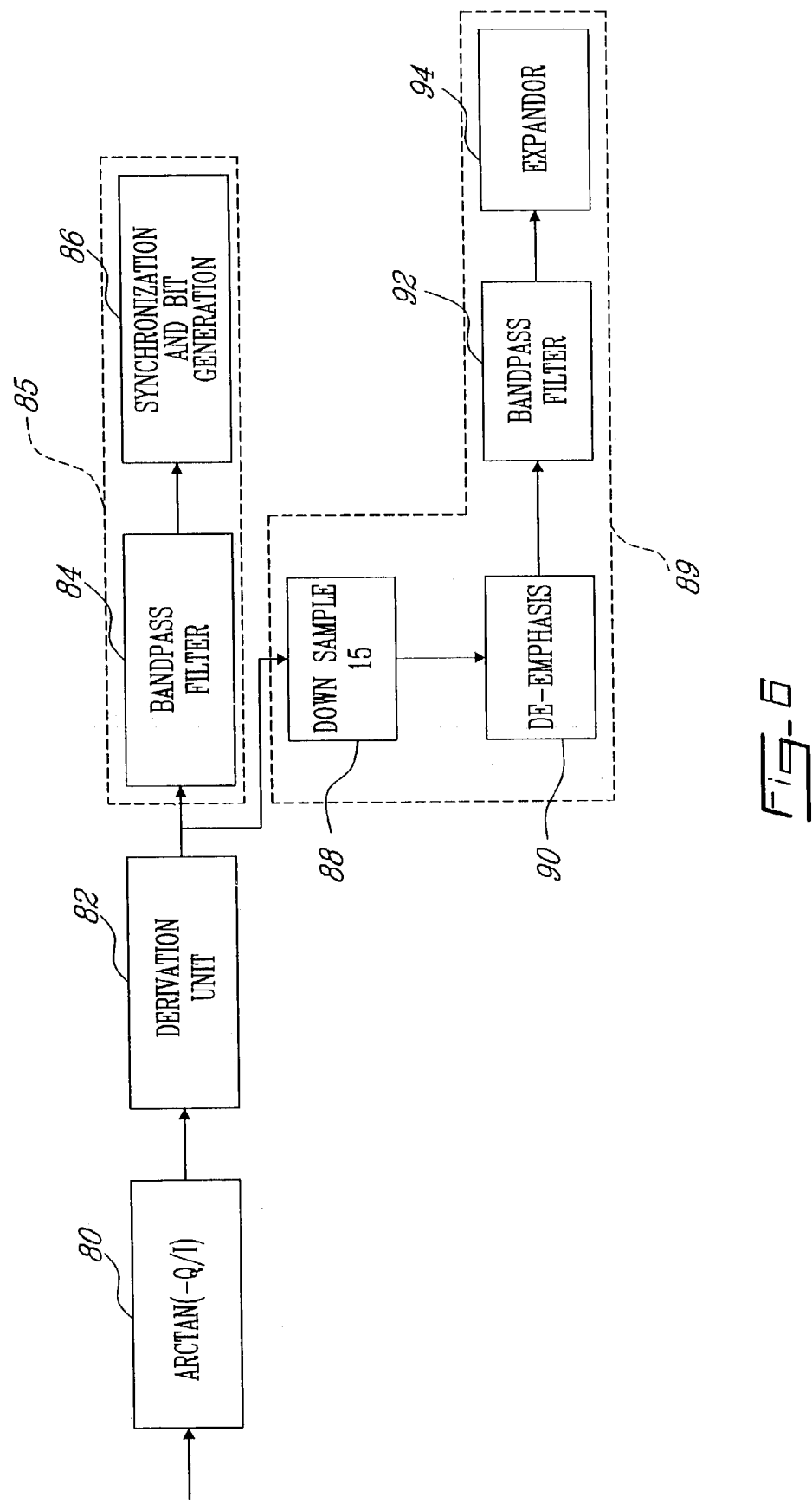
FIG. 6 is a block diagram which shows how a AMPS signal is received.

Now referring to FIG. 6, there is shown an embodiment of the implementation of the reception of an AMPS signal. In the preferred embodiment of the invention, the reception of an AMPS signal is performed as explained below.

The reception of an AMPS signal is performed using at least an arctan module 80, a derivation unit 82, a bandpass filter 84, a synchronization and bit generation unit 86, a 15 down sample unit 88, a de-emphasis unit 90, a bandpass filter 92 and an expander 94.

The arctan module 80 is implemented using CORDIC algorithm in the preferred embodiment of the invention. The arctan module 80 provides an actan signal having a size of 16 bits in the preferred embodiment.

The derivation unit 82 receives the actan signal and provides an output derivative signal having a value comprised between $-2\pi$ and $+2\pi$.

In the preferred embodiment, a correction is performed by the derivation unit 82 in order to provide a value comprised between $-\pi$ and $+\pi$ and corresponding to the smallest rotation between two consecutive arctan signals. This provides a demodulated FM signal.

The demodulated FM signal is then provided to a voice processing unit 89 and to a data processing unit 85.

The data processing unit 85 comprises the bandpass filter 84 and the synchronization and bit generation unit 86.

The bandpass filter 84 is used to isolate the data signal from voice and out-of-band noise. In the preferred embodiment, the bandpass filter 84 provides a signal having 16 bits.

The synchronization and bit generation unit 86 receives the signal originating from the bandpass filter 84 and provides a bitstream. Preferably, 12 consecutive samples of the signal are collected to form a group of samples and used to generate a transmitted bit.

In a group of samples, a transition from a negative level to a positive level is interpreted as a transmitted bit equal to 1; while a transition from a positive level to a negative level is interpreted as a bit equal to 0. A symbol synchronization is performed in order to slice each group of samples in order to have a zero transition at the middle each group of samples.

After providing the bitstream, a SYNC and color code detection is performed.

The voice processing unit 89 comprises the 15 down sample unit 88, the de-emphasis unit 90, the bandpass filter 92 and the expandor 94.

The 15 down sample unit 89 performs a decimation of the signal provided by the derivation unit 82 by a factor of 15 for further voice processing. The output decimated signal has a 8 kS/s sample rate. More precisely and in the preferred embodiment of the invention, the decimation is performed in two steps. The first step of the decimation involves a decimation by a factor of 5 using a $5^{th}$ order filter; while the second step of the decimation involves a decimation by a factor of 3 using a lowpass filter having a cut-off frequency of 3.4 kHz.

The output decimated signal is provided to the de-emphasis unit 90. In the preferred embodiment of the invention, the de-emphasis unit 90 provides a signal attenuation of 6 dB per octave between 300 Hz and 3000 Hz.

In the preferred embodiment of the invention, the bandpass filter 92 is used in order to comply to the AMPS 24 dB/octave attenuation needed below 300 Hz.

The expander 94 is a voice processing module which increases the dynamic range of a signal. The expander 94 first measures the incoming signal power. If the measured incoming signal power is larger than a predetermined threshold, the incoming signal is amplified. If the measured incoming signal power is lower than the predetermined threshold, the incoming signal is attenuated. If the measured incoming signal power is equal to the predetermined threshold, no processing is performed. In AMPS, the power is usually measured using a half-wave rectifier followed by an PC filter ("Advanced Mobile Phone System: Voice and Data Transmission" G. A. Arredondo, J. C. Feggeler and J. I. Smith "The Bell System Technical Journal" January 1979).

Transmitting of an AMPS Signal

Figure 7:
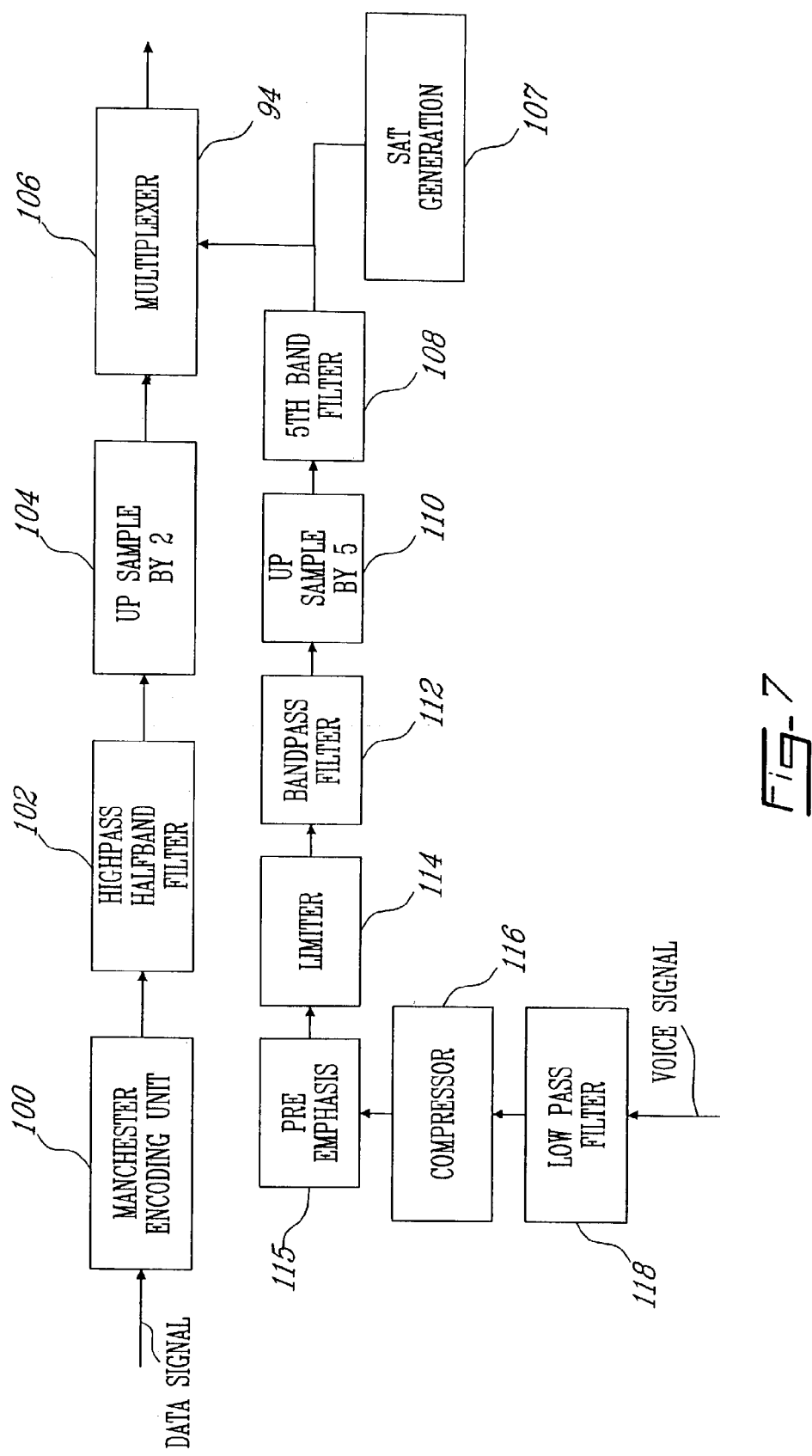
FIG. 7 is a block diagram which shows how a AMPS signal is transmitted.

Now referring to FIG. 7, there is shown how a transmitting of an AMPS signal is performed.

A Manchester encoding unit 100 receives a data signal and provides a Manchester bit encoded signal at a 20 kS/s sample rate. The data signal comprises NRZ encoded bits transmitted at a 10 kbps rate. In the preferred embodiment, the Manchester encoding unit 100 encodes bits using Manchester encoding schemes using the following relation; 1 is encoded in the case of a transition from −1 to 1, while 0 is encoded in the case of a transition from 1 to −1. Such encoding increases therefore the sampling rate by 2.

In the RVC AMPS voice channel, data frequency components between 0 and 3.4 kHz are attenuated in order to minimize the hearing of data in the receiving end. This attenuation is performed by the highpass halfband filter 102.

Another up sampling by 2 is performed by the up sample by 2 unit 104. The up sample by 2 unit 104 provides a signal having a bandwidth of 40 kS/s.

The low pass filter 118 is used for filtering the voice signal. More precisely frequency components located above 3.4 kHz are removed from the voice signal.

The compressor 116 is a voice processing module which reduces the dynamic range of a signal. The compressor 116 first measures the incoming signal power. If the measured incoming signal power is larger than a predetermined threshold, the incoming signal is attenuated. If the measured incoming power is lower than the predetermined threshold, the incoming signal power is amplified. If the measured incoming signal power is equal to the predetermined threshold, no processing is performed. Preferably, the power is measured using a half-wave rectifier followed by a RC filter ("Advanced Mobile Phone System; Voice and Data Transmission" G. A. Arredondo, J. C. Feggeler and J. I. Smith "The Bell System Technical Journal" January 1979).

A pre-emphasis unit 115 is a voice signal processing module which amplifies certain frequency components of the signal provided by the compressor 116. For instance, in the case of AMPS, an increasing amplification of 6 dB per octave is performed between 300 Hz and 3000 Hz.

A limiter 114 is then used for limiting the amplitude of the signal provided by the pre-emphasis unit 115 by chopping the signal so that the peak frequency deviation does not exceed 12 kHz.

A bandpass filter 112 is then used for adapting the signal provided by the limiter 114 in order to comply with AMPS. Preferably, the bandpass filter 112 is a low pass filter. Further processing is performed by the $5^{th}$ band filter 108. In the preferred embodiment, the bandpass filter 112 is not implemented. The $5^{th}$ band filter 108 is used to checks that the signal complies with AMPS attenuations outside the voice band and attenuates images created by the up sampling performed by the up sample by 5 110.

A tone signal with one of frequencies, 5970 Hz, 6000 Hz or 6030 Hz is generated by a SAT (Supervisory Audio Tone) to transmit signal source 107. The SAT (Supervisory Audio Tone) to transmit signal is added to voice transmission signal provided by the $5^{th}$ band filter to provide a voice/SAT to transmit signal.

A multiplexer 106 receives a data to transmit signal provided by the up sample by 2 unit 104 and the voice/SAT to transmit signal and provides a multiplexed signal to a digital up converter among the plurality of digital up converters 27.

Reception of an IS136 Signal

In the preferred embodiment of the invention, the reception of an IS136 signal is performed as explained below.

The digital down converter 26 provides two signals, an I signal and a Q signal, corresponding respectively to the inphase (I) and quadrature (Q) portions of the received narrow-band signal, at a sampling rate of 243 kS/s. The I and Q signals enter the demodulation module and are each demultiplexed into 5 paths using 5 phase shifted downsamplers. The 5 I paths and 5 Q paths each have a sampling rate of 48.6 kSps.

For each I and Q path, a square root raised cosine is used for filtering thus creating 10 sample paths at a sample rate of 24.3 kS/s.

Each associated I and Q are combined into an arctan operation, 5 signal paths at a sample rate of 48.6 kS/s result from this arctan operation. These paths are then demultiplexed by 2 to form 10 signal paths at a sampling rate of 24.3 kS/s. A derivation operation is then performed on each of the 10 signals in the preferred embodiment of the invention.

These 10 signals are then used to generate 10 bitstreams together with 10 associated bitstream weights, each weight being a measure of the probability of that bitstream being the one transmitted. Using the 10 associated bitstream weights, one of the 10 bitstreams is selected as being a suitable signal.

Preferred Implementation of the Invention

Figure 9:
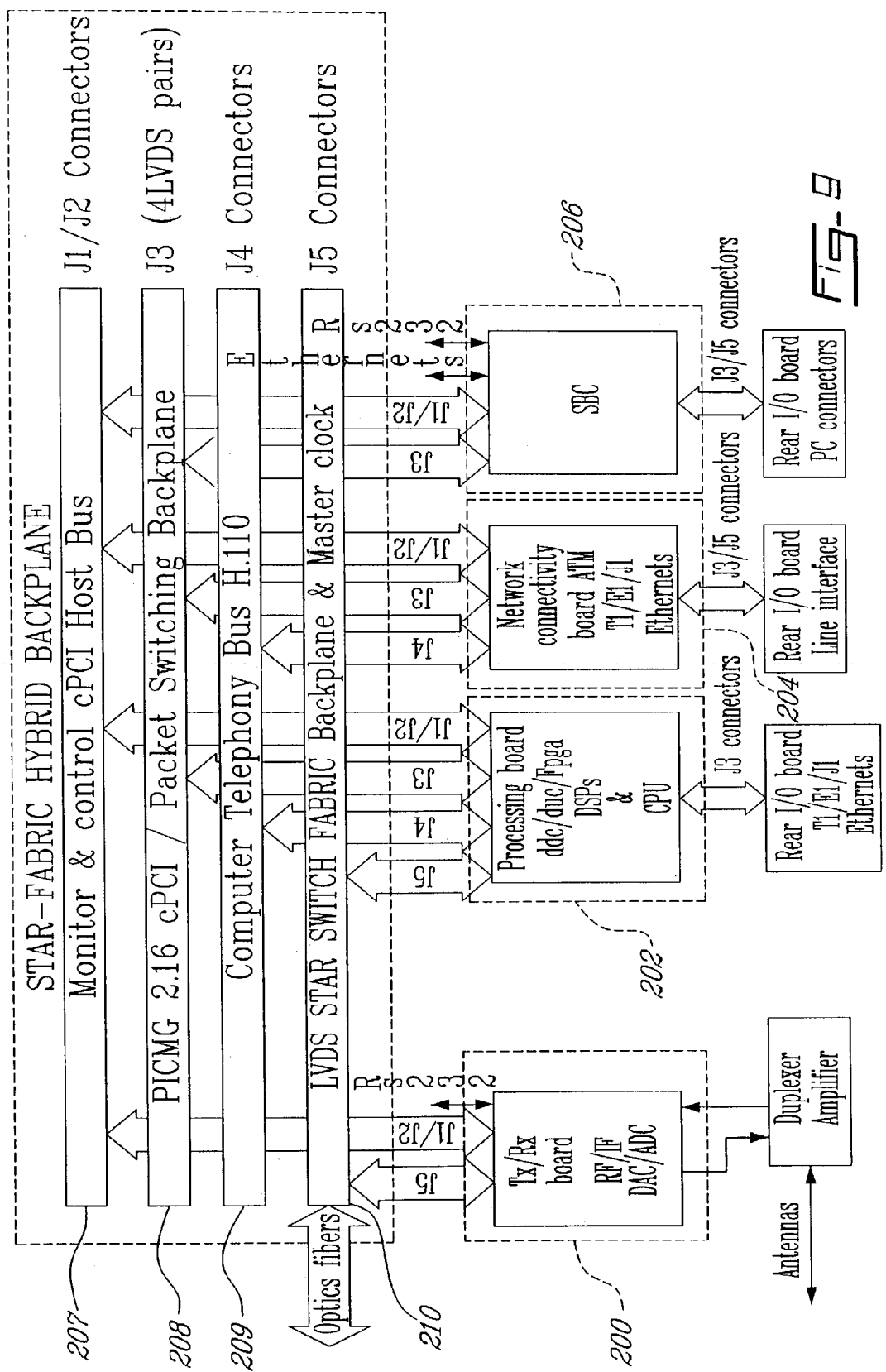
FIG. 9 is a block diagram which shows a preferred implementation of the system; the system comprises a plurality of RF boards, a plurality of processing boards.

Now referring to FIG. 9, there is shown the preferred embodiment of the invention.

The system comprises a plurality of wireless boards 200, a plurality of DSP cards 202, at least one Computer Telephony Integration (CTI) card 204 and a Single Board Computer (SBC) card 206.

The system further comprises a monitor and control CPCI Host Bus 207 to which is connected, using J1/J2 connectors, the plurality of wireless boards 200, the plurality of DSP cards 202, the at least one Computer Telephony Integration (CTI) card 204 and the Single Board Computer (SBC) card 206.

The system further comprises a PICMG 2.16 cPCI/packet switching backplane 208 to which is connected, using J3 connectors, the plurality of DSP cards 202, the at least one Computer Telephony Integration (CTI) card 204 and the Single Board Computer (SBC) card 206.

The system further comprises a Computer Telephony bus H.110 209 to which is connected, using J4 connectors, the plurality of DSP cards 202 and the at least one Computer Telephony Integration (CTI) card 204.

The system further comprises a Low Voltage Differential Signaling (LVDS) star switch fabric backplane and master clock 210 to which is connected, using J5 connectors, the plurality of wireless boards 200 and the plurality of DSP cards 202.

Figure 10:
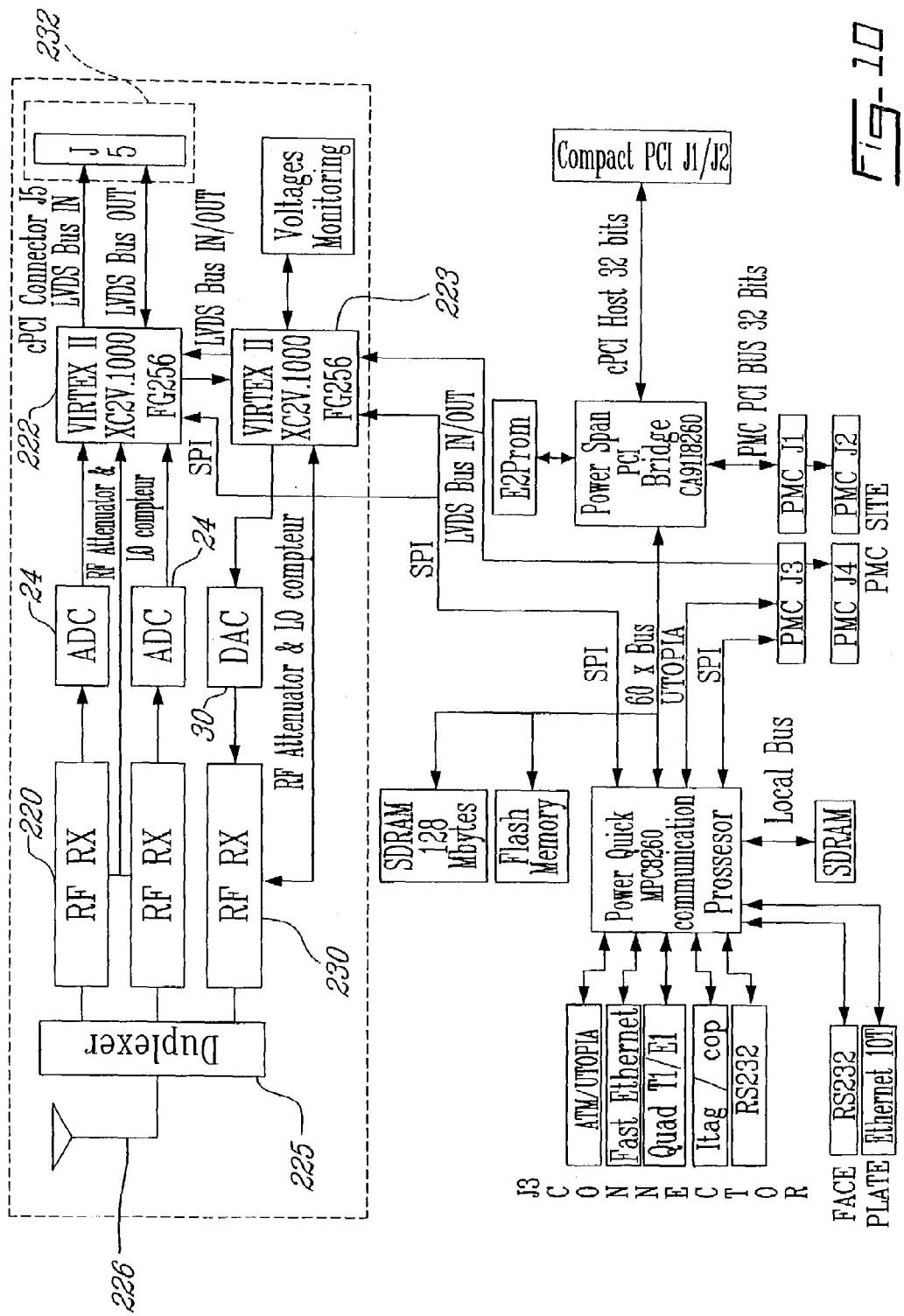
FIG. 10 is a block diagram which shows a RF board.

Now referring to FIG. 10, there is shown one part of the wireless boards 200.

The wireless board 200 comprises two RF front end receivers 220 and one RF front end transmitter 230. Each RF front end receiver 220 is connected to a receiving antenna or one element of an antenna array. The RF front end transmitter 230 is connected to a transmitting antenna. In the embodiment shown in FIG. 10, a single antenna 226 is shared, using a duplexer 225, between the two RF front end receivers 220 and the RF front end transmitter 230.

Preferably, the typical transmitting power output for the whole service band is 0 dBm, but an amplifier may be used if the power output is not sufficient enough.

Still in the preferred embodiment, each RF front end receiver 220 comprises a low noise amplifier (LNA) in order to increase sensitivity. Alternatively, the RF front end receiver 220 may be connected to an external low noise amplifier (LNA) and RF bandpass filter.

Figure 8:
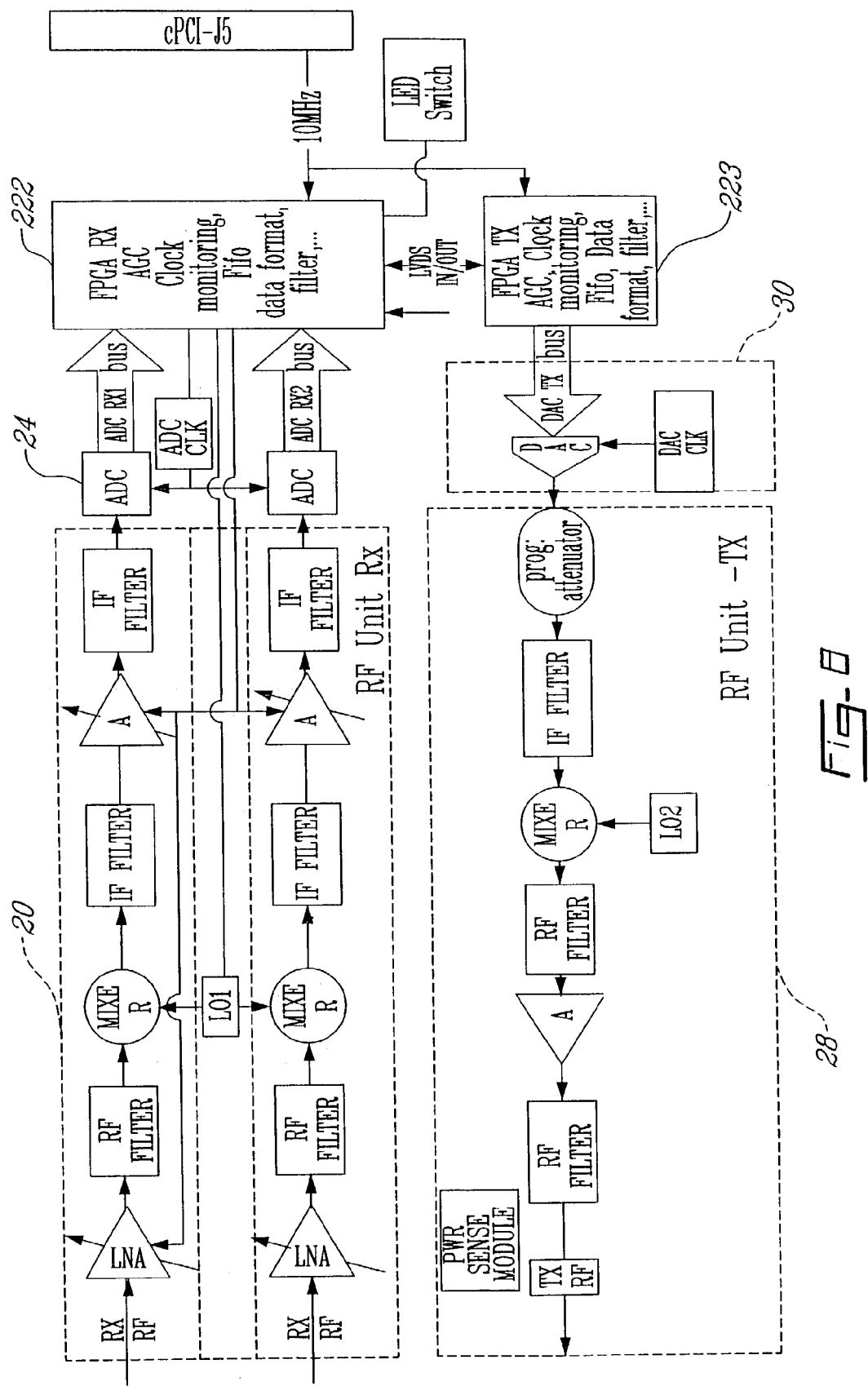
FIG. 8 is a block diagram which shows a RF receiving unit and a RF transmitting unit.

The RF front end receiver 220 is a single conversion receiver. The RF front end receiver 220 uses a RF filter to select a service band which is located between 824 and 849 MHz for a cellular band. A mixer is then used in order to convert the filtered signal to an intermediate frequency (IF). An IF filter is then applied to provide an IF filtered signal. The IF filtered signal is then provided to an attenuator and an amplifier as shown in FIG. 8.

An automatic gain control (AGC) algorithm embedded in the FPGA controls the attenuator to ensure that a resulting signal will be suitable for an analog to digital converter 24.

The ADC 24 digitizes all channels for all waveforms being transmitted by external radios in the receiver service band, Preferably, the ADC 24 has a sampling rate of 78.125 MHz. The ADC 24 provides a digitized signal to an FPGA 222. The FPGA 222 collects four samples of the digitized signal, each having 14 bits. The FPGA 222 further provides an identification packet to the four samples to provide a packet having a size of 64 bits. The identification packet identifies the ADC 24. The packet is provided to a J5 connector 232.

A second FPGA 223 is used to receive a signal originating from the J5 connector 232. More precisely, the second FPGA 223 receives an incoming signal from the J5 connector 232 and removes a header from the packet to provide a data packet. The FPGA 223 further separates the data packet into two different samples. The two different samples are then provided to the digital to analog converter 30.

Figure 11:
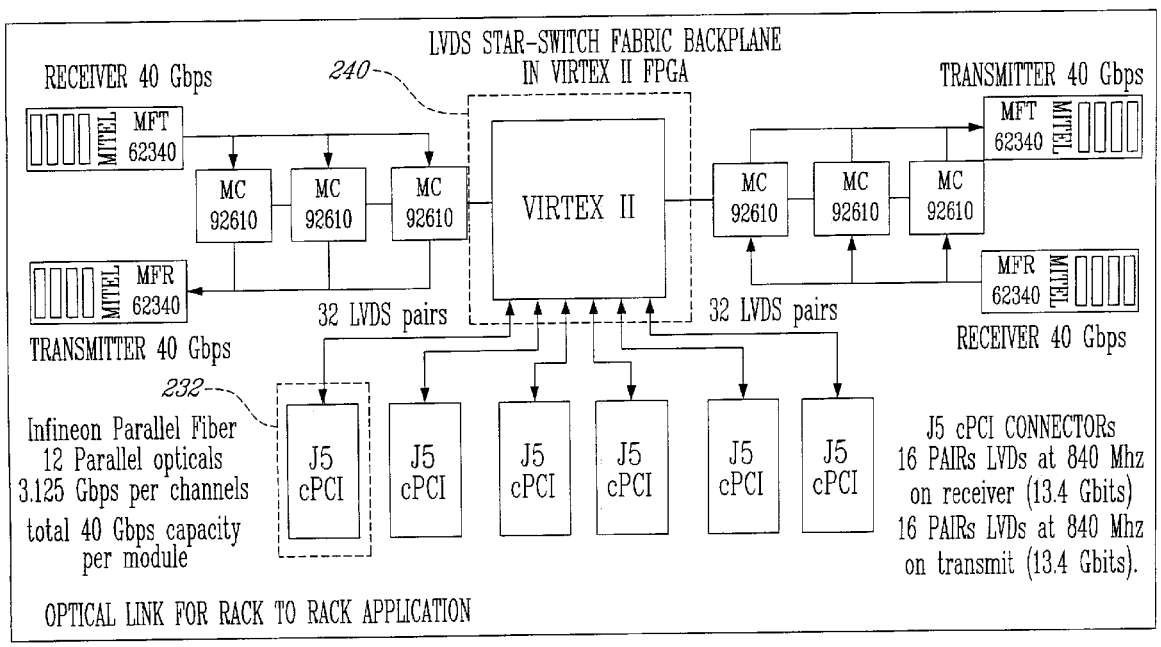
FIG. 11 is a block diagram which shows how switching is implemented preferably.

Now referring to FIG. 11, there is shown a first switching unit 240. In this embodiment, the first switching unit 240 is a Virtex II PPGA.

Up to six elements are connected to the first switching unit 240. Each of the six elements is connected to the first switching unit 240 via the J5 cPCI connector 232. More precisely, each J5 connector 232 comprises 16 pairs of LVDS data operating at 840 MS/s each, and dedicated for receiving signals, and 16 pairs of LVDS data operating at 840 MS/s each dedicated for transmitting signals.

The first switching unit 240 receives data from each of the six J5 cPCI connectors 232 and broadcasts required data to each of the six J5 cPCI connectors 232.

It will be appreciated that two optical receiving/transmitting units may be connected to the first switching unit 240. In this embodiment, the two optical receiving/transmitting units are used in order to extend the capacity of the first switching unit 240. In fact, it will be appreciated that the capacity of the system is set to 6 J5 connectors 232 if the optical receiving/transmitting units are not connected to the first switching unit 240.

Figure 12:
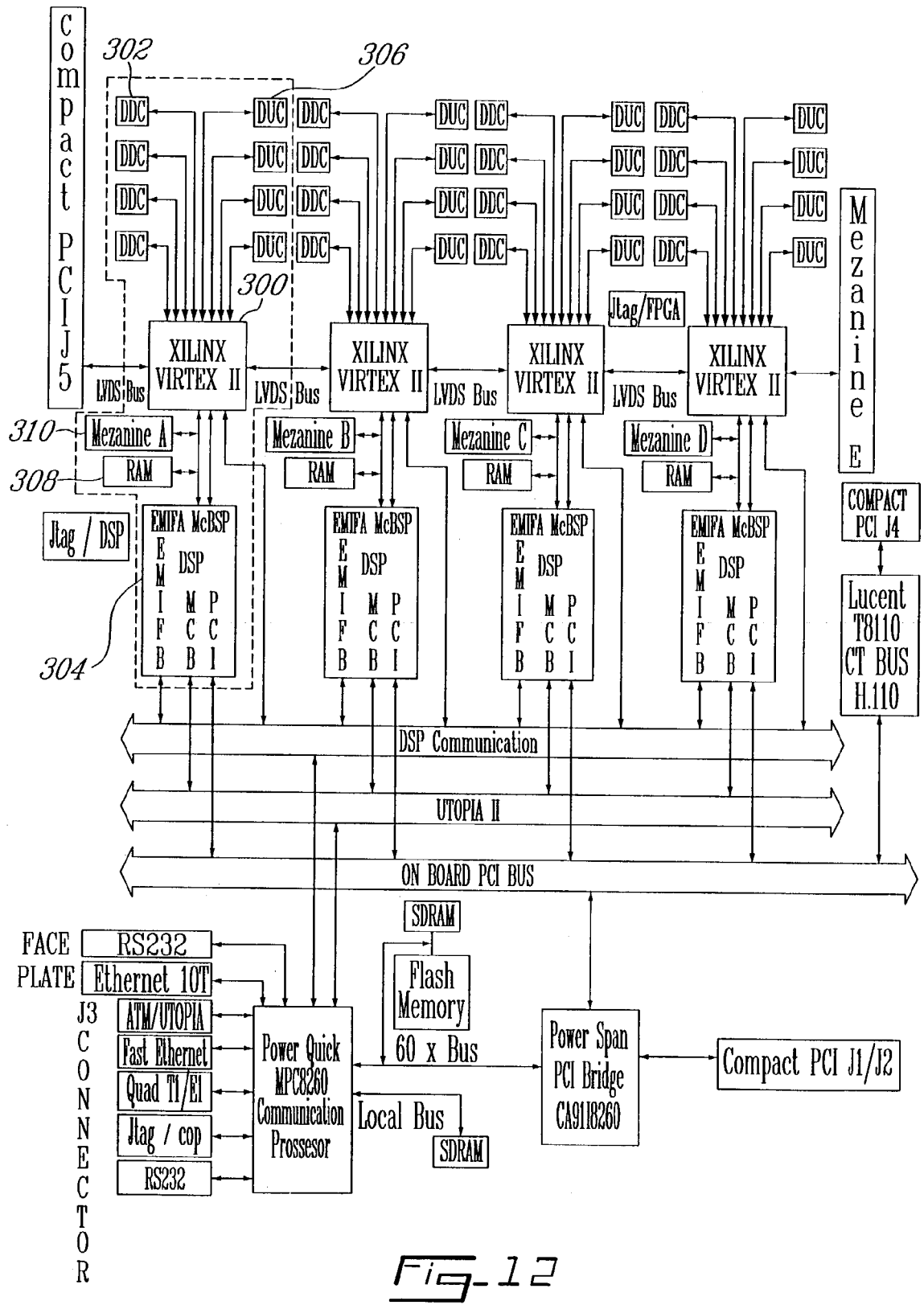
FIG. 12 is a block diagram which shows a DSP board.

Now referring to FIG. 12, there is shown one DSP card 202. Each of the four DSP processors are connected via a J5 connector 232 to the first switching unit 240.

A DSP card 202 may receive data originating from a wireless board 200 connected to the first switching unit 240.

Alternatively, the DSP card 202 may receive data originating from a non wireless board if a Computer Telephony Integration (CTI) card 204 is available. In such a case, incoming data originates from either the PICMG 2.16 cPCI/packet switching backplane 208 or the Computer Telephony bus H.110 209.

The DSP card 202 comprises four sections, each comprising, an FPGS 300, a DSP 304, four quad Digital Down Converter (DDC) 302, four quad Digital Up Converter (DUC) 306, a RAM 308 and a mezzanine A 310.

Preferably a quad DDC 302 is an Intersil ISL 5416, a quad DUC 306 is an Intersil ISL 5217, Upon receiving of data originating from a wireless boards 200, the FPGA 300 selects samples containing a certain identification packet which identifies an ADC 24 as explained above. The selected samples are then forwarded to a selected DDC 302 of the DSP card 202. The selected DDC 302 extracts data samples which correspond to a carrier frequency and provides the extracted data samples to the FPGA 300.

The FPGA 300 demodulates the extracted data samples and provides a demodulated signal to the DSP 304.

The DSP 304 will perform, in the preferred embodiment, de-interleaving, forward error correction, source decoding, layer 2 protocol, layer 3 protocol. The DSP 304 may further be used to perform a source coding of a destination and bridging functions if a protocol conversion is required.

It will be appreciated that each DSP card 202 is able to receive and transmit 64 carrier frequencies. It will also be appreciated that this architecture is scalable and new DSP card 202 may be added to Or removed from the system using a J5 cPCI connectors 232.

The embodiments of the invention described above are intended to be exemplary only. The scope of the invention is therefore intended to be limited solely by the scope of the appended claims.

I claim:

1. A method for forwarding a received signal from a wireless wideband receiving unit operating under a first communication protocol to a transmitting unit operating under a second communication protocol different than said first communication protocol, the method comprising the steps of:
   receiving a wireless wideband RF signal at said receiving unit;
   converting said wireless wideband RF signal to a wideband IF signal and thereafter transmitting said wideband IF signal to a first switching unit;
   transmitting said wideband IF signal from said first switching unit to one of a plurality of narrowband signal converters, said one of a plurality of narrowband signal converters chosen using logic residing in said first switching unit;
   converting said wideband IF signal to a narrowband signal of a first communication protocol at said one of a plurality of narrowband signal converters;
   receiving said narrowband signal of a first communication protocol from said narrowband signal converter at a second switching unit;
   transmitting said narrowband signal of a first communication protocol from said second switching unit to a protocol converter, said protocol converter configured to receive a narrowband signal having said first communication protocol;
   selecting a second communication protocol from a protocol data storing memory having a plurality of communication protocols and thereafter configuring said protocol converter to generate a narrowband signal of a second communication protocol, said protocol data storing memory coupled to said protocol converter;
   converting said narrowband signal of a first communication protocol into a narrowband signal of a second communication protocol at said protocol converter;
   transmitting said narrowband signal of a second communication protocol from said protocol converter to said second switching unit;
   selecting a transmitting unit from a plurality of transmitting units using logic residing in said second switching unit, each transmitting unit of the plurality of transmitting units adapted to receive and transmit a narrowband signal; and
   transmitting said narrowband signal of a second communication protocol from said second switching unit to the selected transmitting unit of the plurality of transmitting units.

2. The method as claimed in claim 1, further comprising the step of selecting a first protocol from a plurality of protocols, further comprising the step of selecting a suitable narrowband signal converter from a plurality of narrowband signal converters, the selected suitable narrowband signal converter providing the received narrowband signal; the selected suitable narrowband signal converter operating according to the first selected protocol.

3. The method as claimed in claim 1, further comprising the step of adding a protocol to the plurality of protocols.

4. The method as claimed in claim 1, further comprising the step of adding a transmitting unit to the plurality of transmitting units.

5. The method as claimed in claim 2, further comprising the step of adding a narrowband signal converter to the plurality of narrowband signal converters.

6. An apparatus for receiving a wireless signal and transmitting at least one part of the wireless signal using a plurality of wireless transmitting units, the apparatus comprising:
   a plurality of wireless wideband receiving units for receiving a wireless wideband RF signal and converting said wireless wideband RF signal to a wideband IF signal;
   a plurality of narrowband signal providing units each having a narrowband signal converter for converting said wideband IF signal to a narrowband signal of a first communication protocol;
   a plurality of wideband signal converters, each adapted to receive a narrowband signal and provide a wideband signal;
   a plurality of wireless wideband transmitting units for receiving a wideband signal and transmitting said wireless wideband signal;
   a first switching unit coupled to said plurality of narrowband signal providing units, said plurality of wireless receiving units, said plurality of wideband signal converters and said plurality of wireless wideband transmitting and a plurality of wireless wideband transmission units, said first switching unit having logic residing thereon for selecting one of said plurality of narrowband signal providing units, one of said plurality of wireless receiving units, one of said plurality of wideband signal converters and one of said plurality of wireless wideband transmitting units;
   a second switching unit coupled to the plurality of narrowband signal providing units, and the plurality of wideband signal converters, said switching unit configured to select a wideband signal converter from said plurality of wideband signal converters in accordance with a wideband signal converter selection signal, said second switching unit having logic residing thereon for receiving a signal from one of a plurality of narrowband signal providing units and thereafter selecting a device chosen from the group consisting of said plurality of wideband signal converters, a protocol converter and a plurality of transmitting units and providing said signal to said selected device; and
   a protocol converter connected to the second switching unit, the protocol converter configured for receiving the narrowband signal from the narrowband signal providing unit and providing a converted narrowband signal to the selected wideband signal converter in accordance with a protocol selection signals,
   said protocol converter comprising a protocol processing unit for implementing a protocol in accordance with the protocol selection data, the protocol converter further comprising a protocol data storing memory having a plurality of communication protocols for converting a narrowband signal, said protocol data storing memory storing data related to each of the plurality of protocols, the protocol data storing memory receiving the protocol selection signal and providing data according to the protocol selection signal to the protocol processing unit.

7. The apparatus as claimed in claim 6, wherein the narrowband signal providing unit comprises a plurality of narrowband signal converters, each adapted to receive a wideband signal and provide a narrowband signal, further wherein the switching unit is adapted to select a narrowband signal converter from the plurality of narrowband signal converters in accordance with a narrowband signal converter selection signal to provide the narrowband signal.

8. The apparatus as claimed in claim 7, further comprising a plurality of wireless wideband receiving units, each of the plurality of wireless wideband receiving units adapted to provide a wideband signal, further wherein the switching unit is adapted to select a wireless wideband receiving unit of the plurality of wireless wideband receiving units to provide the wideband signal in accordance with a wireless wideband receiving unit selection signal.

9. The apparatus as claimed in claim 7, wherein the plurality of narrowband signal converters comprise a plurality of digital down converters.

10. The apparatus as claimed in claim 6, wherein the protocol database may be updated.

11. The apparatus as claimed in claim 6, wherein the protocol converter and the switching unit are comprised in an FPGA.

12. The apparatus as claimed in claim 6, wherein a wideband signal converter comprises a digital up converter.

13. An apparatus for forwarding a received signal to a transmitting unit operating under a second communication protocol, the apparatus comprising:
   a plurality of wireless wideband receiving units for receiving a wireless wideband RF signal and converting said wireless wideband RF signal to a wideband IF signal;
   a plurality of narrowband signal providing units each having a narrowband signal converter for converting said wideband IF signal to a narrowband signal of a first communication protocol;
   a protocol converter for receiving a narrowband signal and providing a protocol converted narrowband signal according to a protocol selection signal, said protocol converter further comprising a protocol data storing memory having a plurality of communication protocols for converting said narrowband signal from a first communication protocol to a second communication protocol different than said first communication protocol, said protocol data storing memory storing data related to each of the plurality of communication protocols, said protocol converter having a protocol processing unit implementing a protocol in accordance with the protocol selection signal, the protocol data storing memory for receiving the protocol selection signal and providing data according to the protocol selection signal to the protocol processing unit;
   a plurality of transmitting units, each of the plurality of transmitting units adapted to receive a narrowband signal and to transmit the narrowband signal; and
   a switching unit for connecting the plurality of narrowband signal providing units to the protocol converter and further to a selected transmitting unit of the plurality of transmitting units in accordance with a transmitting unit selection signal and to the protocol selection signal, said switching unit having logic residing thereon for receiving a signal from one of a plurality of narrowband signal providing units and thereafter selecting a device chosen from the group consisting of said protocol converter and said plurality of transmitting units and thereafter providing said signal to said selected device.

14. The apparatus as claimed in claim 13, wherein the narrowband signal providing unit comprises a plurality of narrowband signal converters, each of the plurality of narrowband signal converters adapted to receive a wideband signal and to provide a narrowband signal, further wherein a narrowband signal converter is selected from the plurality of narrowband signal converters to provide the narrowband signal.

15. A method for receiving a wireless signal and transmitting at least one part of the wireless signal using a plurality of wireless transmitting units, the method comprising the steps of:

receiving a wireless wideband RF signal at said receiving unit;

converting said wireless wideband RF signal to a wideband IF signal and thereafter transmitting said wideband IF signal to a first switching unit;

transmitting said wideband IF signal from said first switching unit to one of a plurality of narrowband signal converters, said one of a plurality of narrowband signal converters selected using logic residing in said first switching unit;

converting said wideband IF signal to a narrowband signal at said one of a plurality of narrowband signal converters;

receiving said narrowband signal from said one of a plurality of narrowband signal converters at a second switching unit;

transmitting said narrowband signal from said second switching unit to a protocol converter, said protocol converter configured to receive a narrowband signal;

selecting a second communication protocol from a protocol data storing memory having a plurality of communication protocols for converting the received narrowband signal and thereafter configuring said protocol converter to generate a converted narrowband signal of a second communication protocol, said protocol data storing memory coupled to said protocol converter;

converting the received narrowband signal according to the selected protocol;

converting said narrowband signal into a converted narrowband signal of a second communication protocol at said protocol converter according to the selected protocol;

transmitting said narrowband signal of a second communication protocol from said protocol converter to said second switching unit;

selecting a wideband signal converter from a plurality of wideband signal converters, each adapted to receive and convert a narrowband signal into a wideband signal, said suitable wideband signal converter selected using logic residing within said second switching unit;

transmitting said converted narrowband signal from said second switching unit to said selected wideband signal converter;

converting said converted narrowband signal to a converted wideband signal at said selected wideband signal converter;

receiving a converted wideband signal from the selected wideband signal converter at said first switching unit;

selecting a suitable wireless wideband transmitting unit from a plurality of wireless wideband transmitting units, said selected wireless wideband transmitting unit selected using logic residing within said first switching unit; and transmitting the wideband converted signal using the selected wireless wideband transmitting unit.

16. The method as claimed in claim 15, further comprising the step of selecting a suitable narrowband signal converter from a plurality of narrowband signal converters, each adapted to receive a wideband signal and provide a narrowband signal, the selected suitable narrowband signal converter providing the received narrowband signal.

17. The method as claimed in claim 16, further comprising the step of selecting a suitable wireless wideband receiving unit from a plurality of wireless wideband receiving units, further comprising the step of receiving a wireless wideband signal using the selected suitable wireless wideband receiving unit and providing the received wideband signal to the selected suitable narrowband signal converter.

18. The method as claimed in claim 17, wherein the narrowband signal converter is a digital down converter providing an I signal and a Q signal.

19. The method as claimed in claim 15, wherein the wideband signal converter is a digital up converter.

20. The method as claimed in claim 19, further comprising the step of converting the wideband converted signal into an analog wideband converted signal.

21. The method as claimed in claim 15, wherein the plurality of protocols comprises AMPS and IS136.

22. The method as claimed in claim 15, further comprising the step of adding a suitable wideband signal converter to the plurality of suitable wideband signal converters.

23. The method as claimed in claim 15, further comprising the step of adding a wireless wideband transmitting unit to the plurality of wireless wideband transmitting units.

24. The method as claimed in claim 15, further comprising the step of adding a protocol to the plurality of protocols.

* * * * *